United States Patent [19]

Sanderson

[11] Patent Number: 4,560,331
[45] Date of Patent: Dec. 24, 1985

[54] LUBRICANT RESERVOIR

[75] Inventor: George F. Sanderson, Glasgow, Scotland

[73] Assignee: James Howden & Company Limited, Scotland

[21] Appl. No.: 668,651

[22] Filed: Nov. 6, 1984

[30] Foreign Application Priority Data

Nov. 7, 1983 [GB] United Kingdom ............... 8329688

[51] Int. Cl.⁴ ............................................. F04B 9/08
[52] U.S. Cl. .................................................. 418/65
[58] Field of Search ........................... 184/65, 81, 83

[56] References Cited

U.S. PATENT DOCUMENTS 1,901,749  3/1933  Johnson ........................... 184/81 X
2,965,198 12/1960  Williams et al. ..................... 184/81

*Primary Examiner*—Leonard E. Smith
*Attorney, Agent, or Firm*—Barnes & Thornburg

[57] ABSTRACT

A reservoir for gravity feeding lubricant to a bearing, comprising a receptacle having a peripheral wall 11, a lower outlet 18 for the outflow of lubricant to the bearing, an annular weir 22 surrounding an inner space 32 around the lower outlet 18 an inlet 16 positioned to feed lubricant into the outer space 30 between the peripheral wall 11 and the weir 22 when the flow of lubricant is low and a bleed passage 28 in the annular weir permitting a limited amount of lubricant to flow between the outer space 30 and the inner space 32, a greater flow of lubricant taking place when the lubricant can pass over the weir either by being projected directly from the inlet 16 and/or by lubricant overflowing from the outer space 30 to the inner space 32. This arrangement effectively provides a variable outflow of lubricant depending on the inflow rate.

5 Claims, 6 Drawing Figures

LUBRICANT RESERVOIR

DESCRIPTION

The present invention relates to a reservoir for gravity feeding lubricant to a bearing. There has been proposed in European Pat. No. 0073281A, a bearing particularly a heavy duty bearing, in which lubrication is effected by lubricant being picked up on a disc mounted on the bearing shaft, the disc having, at its periphery, an axially extending ring on the inner and outer surface of which the lubricant forms a film. During start up, lubricant on the outer surface is scraped of by an external scraper and falls under gravity on to the bearing surface and, as the speed increases, lubricant on the inner surfaces is picked up by the scoop to produce a pressure head sufficient to pump the lubricant to a reservoir from which it flows to the bearing surface under gravity. The lubricant is pumped to the reservoir through an external cooler and an external filter.

Such a construction is very satisfactory and substantially reduces the cost as compared with known bearings and yet allows one to provide a cooler and a filter without the necessity for a separate pump. One problem does arise when the bearing is used to run at low speeds. It has been found that with the lower sump of the bearing full of oil, the performance of the pump is reduced to such an extent that the bearing is capable of using more oil than the pump (provided by the disc and the scoop) could deliver.

It is now proposed, according to the present invention, to provide a reservoir for gravity feeding lubricant to a bearing, said reservoir comprising a receptacle having a peripheral wall, a lower outlet from said receptacle for the outflow of lubricant, an annular weir surrounding an inner space around said lower outlet, an inlet positioned to feed lubricant into the outer space between said peripheral wall and said annular weir and a bleed passage in said annular weir permitting a limited amount of lubricant to flow between said outer and inner spaces, a greater flow of lubricant taking place when the lubricant can pass over said weir.

With such a construction, at lower running speeds, the lubricant falls from the inlet into the outer space surrounding the annular weir and passes through the bleed passage. This allows sufficient lubricant to be delivered to the bearing to meet the lubrication requirements while restricting the flow to such an extent that the level of lubricant in the sump falls. Rather surprisingly it has been found that with the level of lubricant in the sump low, the pumping performance efficiency is improved dramatically.

As the lower sump empties and the pump performance improves, more lubricant is delivered to the reservoir. As this happens, some lubricant can pass over the weir direct into the inner space so that it can flow more freely to the bearing through the outlet from the inner space. The lubricant which falls outside the annular weir increases in depth such that it eventually starts to flow over the top of the annular wall, this increasing the oil supply to the bearing.

In a simple construction, the outlet is formed actually in the bottom wall of the receptacle. The bleed passage may be in the form of an aperture, of a size designed to meet the particular requirements of the bearing, through the annular wall adjacent to the bottom wall of the receptacle.

In one particular construction, the annular weir is positioned sufficiently close to the inlet for lubricant to pass directly from the inlet into the inner space, when a full flow of luricant is taking place.

In order that the present invention may more readily be understood, the following description is given, merely by way of example, reference being made to the accompanying drawing, in which.

Figure 1:
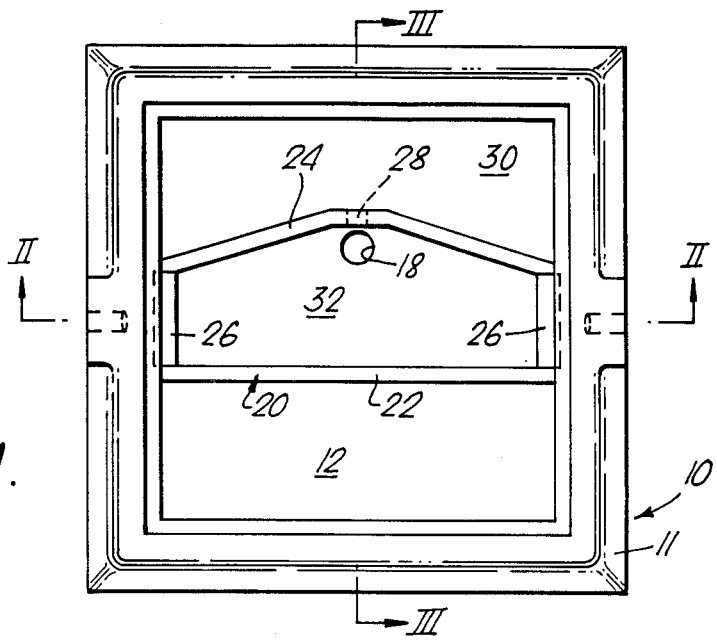
FIG. 1 is a plan view of one embodiment of reservoir according to the present invention.
Figure 2:
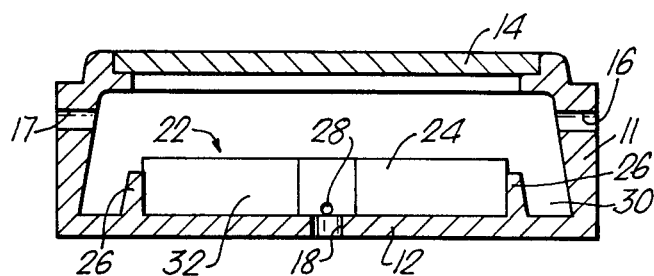
FIG. 2 is a section taken along the line II, II of FIG. 1.
Figure 3:
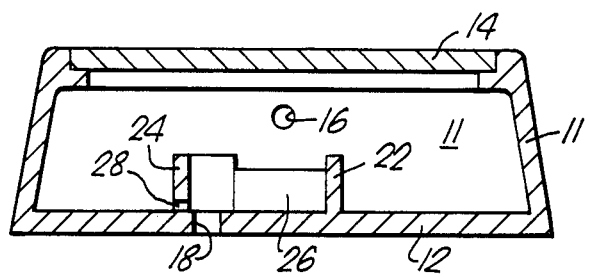
FIG. 3 is a section along the line III, III of FIG. 1.

The reservoir illustrated in the drawings comprises a receptacle 10 having a peripheral wall 11 and a bottom wall 12, the reservoir illustrated being of generally square shape as viewed in plan. A cover 14 is shown in FIG. 2, but has been omitted in FIG. 1 for the sake of clarity. An inlet 16 for lubricant is provided on the right hand side as seen in FIG. 2 and a similar inlet 17 is shown on the left hand side but will normally be blocked off. Formed in the bottom wall 12 is an outlet 18 and this is surrounded by an annular weir 20 consisting of a front wall 22 a rear wall 24 and two side walls 26 which are slightly lower than the front and rear walls. A bleed orifice 28 is formed in the rear wall and connects the outer space 30 formed outside the annular weir 20 with the inner space 32 surrounded by the annular weir and from which the outlet 18 opens.

Figure 5:
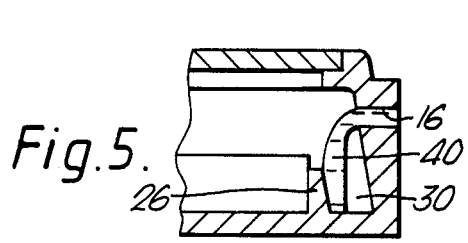
FIG. 5 is a view similar to FIG. 4 showing a low flow rate of lubricant.

In use, during a relatively slow running speed, the lubricant 40 flows in as shown in FIG. 5 at a relatively low rate and falls outside the annular weir 26 into the outer space 30. It can then flow through the relatively small bleed passage 28 into the inner space 32 from which it can flow out through the outlet 18 to a bearing as illustrated, for example, in European Patent 0073281A.

Figure 6:
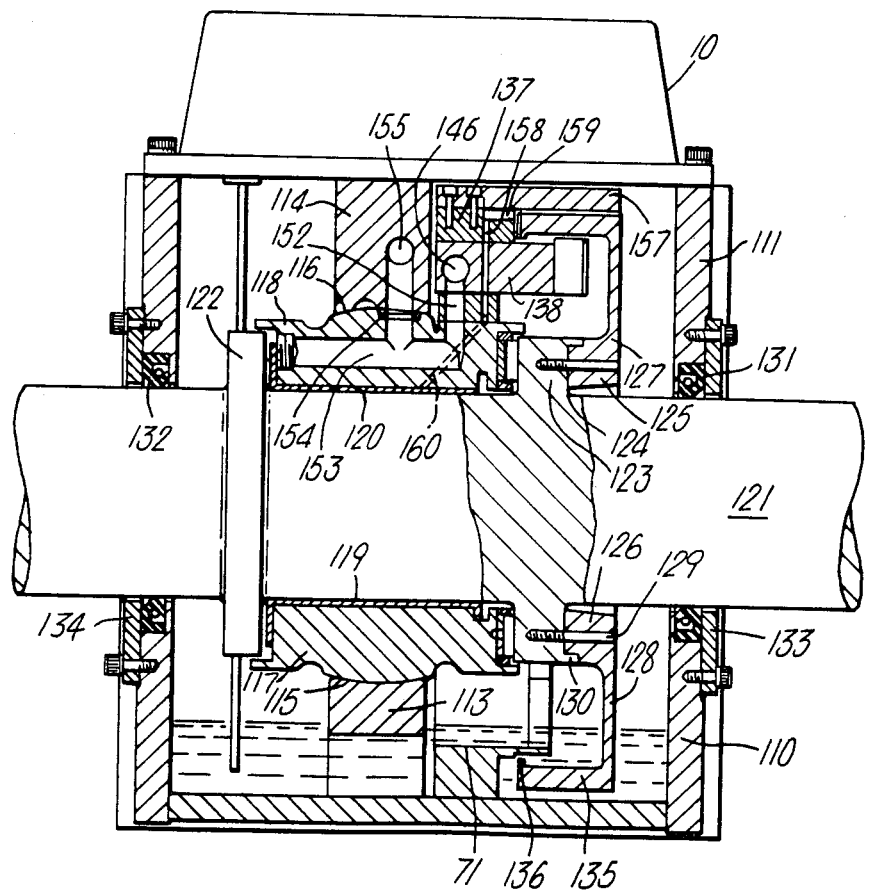
FIG. 6 is a cross-section through one embodiment of bearing as illustrated in European Patent 0073281A.

FIG. 6 illustrates the bearing of that Patent and the following is a portion of the description thereof to which 100 has been added to the reference numerals. The bearing comprises a lower casing half 110 having bolted thereon an upper casing 111 surmounted by the lubricant reservoir 10. Mounted on the casing parts are lower and upper outer fixed parts or keeps 113 and 117 of the bearing, these having part-spherical inner surfaces 115 and 116 which cooperate with part-spherical surfaces on shell halves 117 and 118. The inner surfaces of the shell halves have conventional white metal bearing shells 119 and 120 forming bearing surfaces for the shaft 121 which has radially extending rims 122 and 123, thus providing a self-aligning bearing of a conventional type. The right hand surface of the rim 123 has a central annular recess 124 formed therein in which is located the two radially inner hub parts 125, 126 of disc halves 127 and 128 respectively. These disc parts are secured by bolts 129 which extend through the hub parts 125, 126 and into the rim 123. The recess 124 leaves a peripheral rib 130 into which the hub parts 125 and 126 are snugly engaged to reduce any tendency for the disc parts to fly out during high speed operation.

At the axial ends, the bearing is provided with seals 131 and 132 held in place by seal plates 133 and 134. At its outer periphery the disc 128 carries an axially inwardly extending ring 135 having a lip 136 at its inner axial end.

The shell 118 carries, on the side of the keep 114 facing the disc 128, a support member 137 which carries a scoop assembly 138 which extends within the ring 135. This scoop assembly includes two oppositely curved scrolls which have their axes substantially parallel to the axis of the shaft 121. The scrolls include wall portions radially spaced from the outermost part of the scroll to provide two oppositely directed mouths. The two channels formed between the outermost part of each scroll and the wall portions are of increasing cross-section as they lead away from the mouth.

The member 136 has a transverse bore 146 therein which accommodates a valve ball, extreme positions of which are determined by stoppers located in longitudinal bores in the member 136 and communicating with the interior of the scrolls. The transverse passage 146 connects directly to a closed conduit 152 which leads, via a bore 153 provided with O-ring 154, to a duct 155 in the keep 114. This duct leads out of a side of the bearing and communicates with an outlet pipe.

Also mounted on the member 137 is a scraper 157 which rubs on the external surface of the ring 135 to scrape the lubricant therefrom. The lubricant so scraped is led to an aperture 158 in the member 137 and thence into a trough 159 and finally via radial bores 160 to the bearing surface 120.

Figure 4:
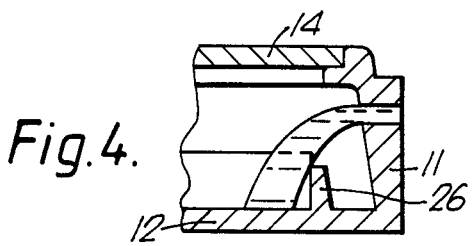
FIG. 4 is a view similar to the right hand portion of FIG. 2 showing a full flow of lubricant.

It has been found that during low running with the construction illustrated in that patent the efficiency of the pumping effect is not very high when the lower pump of the bearing is relatively full and the bearing absorbs more lubricant than is actually pumped. Because of the arrangement illustrated, during initial operation at low speed the flow of lubricant from the inner space is, in effect, controlled by the inflow into that space through the bleed passage 28. As a result of this the return of lubricant to the sump of the bearing is reduced and the level in the sump drops. When this has happened the efficiency of pumping increases significantly and the lubricant is thereby forced at a greater pressure from the inlet 16 and is projected as shown at 41 in FIG. 4. Once this has happened the situation continues in this manner. While the lubricant is shown projected over the annular weir 26 in FIG. 4, the situation will often arise in which the lubricant is caused to flow in a manner between that shown in FIGS. 4 and 5 so that some of its falls outside and some of it inside the annular weir until the space 30 is full whereupon the lubricant will simply flow over the weir into the inner space.

We claim:

1. A reservoir for gravity feeding lubricant to a bearing, said reservoir comprising a receptacle having a peripheral wall, a lower outlet from said receptacle for the outflow of lubricant, an annular weir surrounding an inner space around said lower outlet, an inlet positioned to feed lubricant into the outer space between said peripheral wall and said annular weir and a bleed passage in said annular weir permitting a limited amount of lubricant to flow between said outer and inner spaces, a greater flow of lubricant taking place when the lubricant can pass over said weir.

2. A reservoir as claimed in claim 1 wherein said reservoir further comprises a bottom wall and wherein said outlet is formed in said bottom wall.

3. A reservoir as claimed in claim 2, wherein the bleed passage is in the form of an aperture through said annular weir adjacent the bottom wall of the receptacle.

4. A reservoir as claimed in claim 1, wherein the annular weir is positioned sufficiently close to the inlet for lubricant to pass directly from the inlet to the inner space, when a full flow of lubricant is taking place.

5. In a bearing comprising a fixed part having a bearing surface, a shaft rotatable in the bearing surface, a radially extending disc mounted on the shaft for rotation therewith, an axially extending ring mounted on said disc at a location spaced radially from the shaft, a lubricant reservoir, means to feed lubricant from the outlet of said reservoir to said bearing surface, means to lead lubricant from said bearing surface to the vicinity of the lower part of said ring, a lubricant scoop mounted within said ring and closely adjacent thereto, a closed conduit leading from said scoop to the inlet of said reservoir, the scoop being so-shaped whereby, upon rotation of said shaft, a film of lubricant is formed on the inner surface of said ring, this film being picked up by said scoop to produce a pressure head sufficient to pump lubricant to the inlet of said reservoir, the improvement consisting in that said reservoir comprising a receptacle having a peripheral wall, a lower outlet from said receptacle for the outflow of lubricant, an annular weir surrounding an inner space around said lower outlet, an inlet positioned to feed lubricant into the outer space between said peripheral wall and said annular weir and a bleed passage in said annular weir permitting a limited amount of lubricant to flow between said outer and inner spaces, a greater flow of lubricant taking place when the lubricant can pass over said weir.

* * * * *